United States Patent

[11] 3,590,497

[72] Inventor David A. Darby
2218 Emerson Ave, Salt Lake City, Utah 84115
[21] Appl No 811,814
[22] Filed Apr. 1, 1969
[45] Patented July 6, 1971

[54] TEACHING AND EVALUATION MACHINE
15 Claims, 10 Drawing Figs.

[52] U.S. Cl. ........................................... 35/9, 346/49
[51] Int. Cl. ................................................ G09b 7/06
[50] Field of Search ........................................ 35/8, 9, 11, 48, 48.2, 22; 346/33 ME, 49, 37

[56] References Cited
UNITED STATES PATENTS
3,077,038 2/1963 Williams et al. ............... 35/9
3,163,486 12/1964 Tomes ....................... 346/33 (MED)
3,251,142 5/1966 Jazbutis ...................... 35/11
3,299,534 1/1967 Schlafly ...................... 35/9

Primary Examiner—Wm. H. Grieb
Attorney—B. Deon Criddle

ABSTRACT: A teaching and evaluation machine, wherein a slide projector is used to present informative material and/or questions and multiple possible answers to the questions and to simultaneously provide signals indicative of the correct answer to a control circuit while regulating the time allowed for answer selections. The control circuit is also connected to a test panel, or selector, having an information change button and a number of possible multiple choice selection buttons corresponding to the possible answers, and to a continuous strip chart recorder whereon selection button choices are recorded in a pattern that also indicates a correct answer, on a time basis and in conjunction with a continuous physiological response measurement of the subject being tested and/or evaluated.

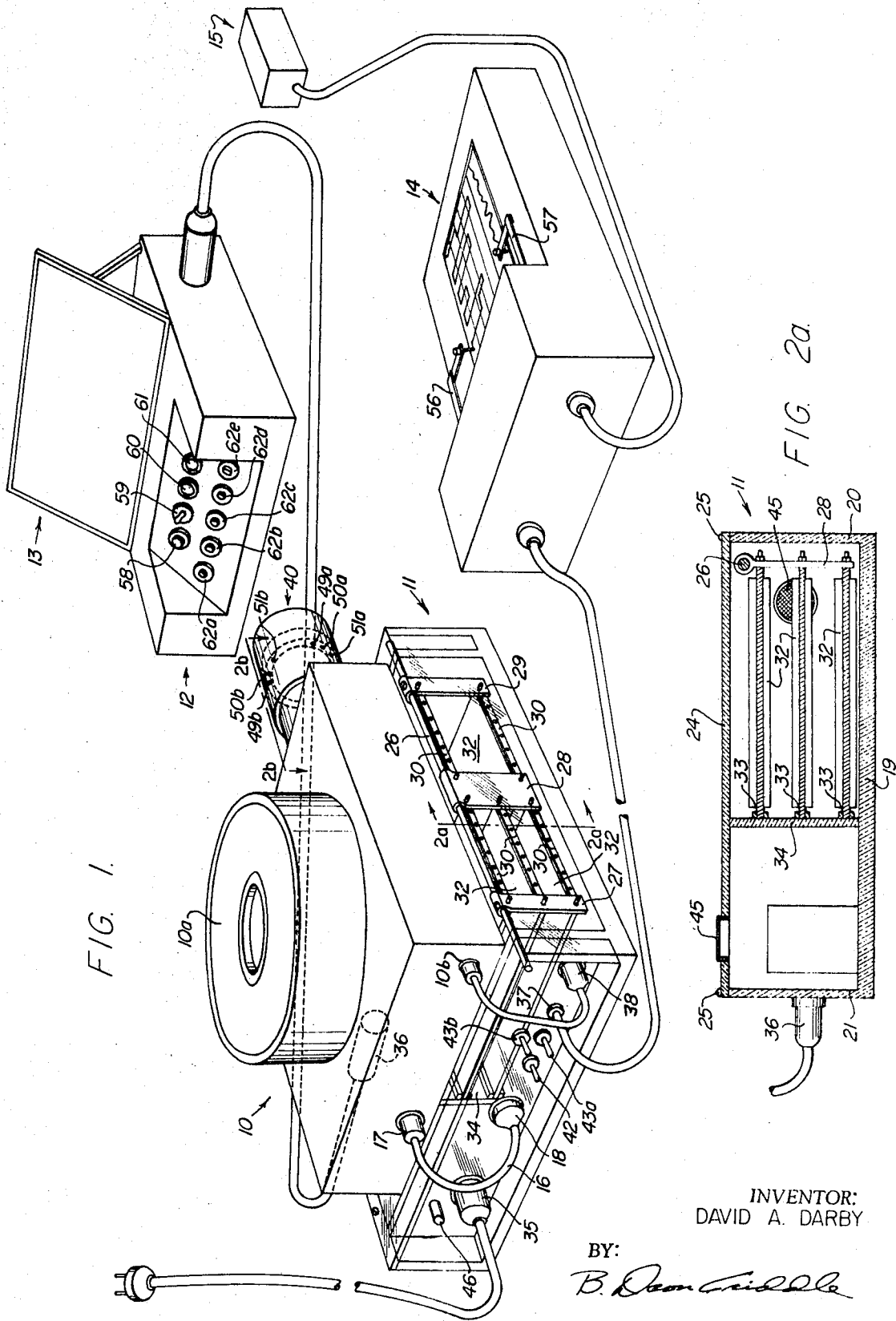

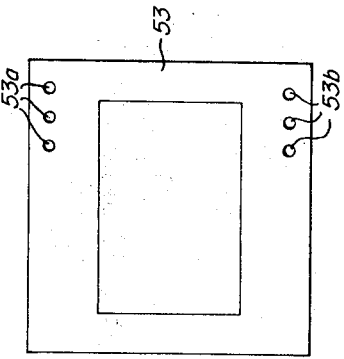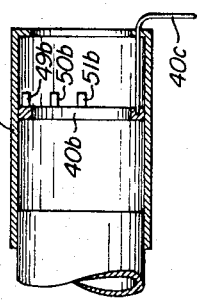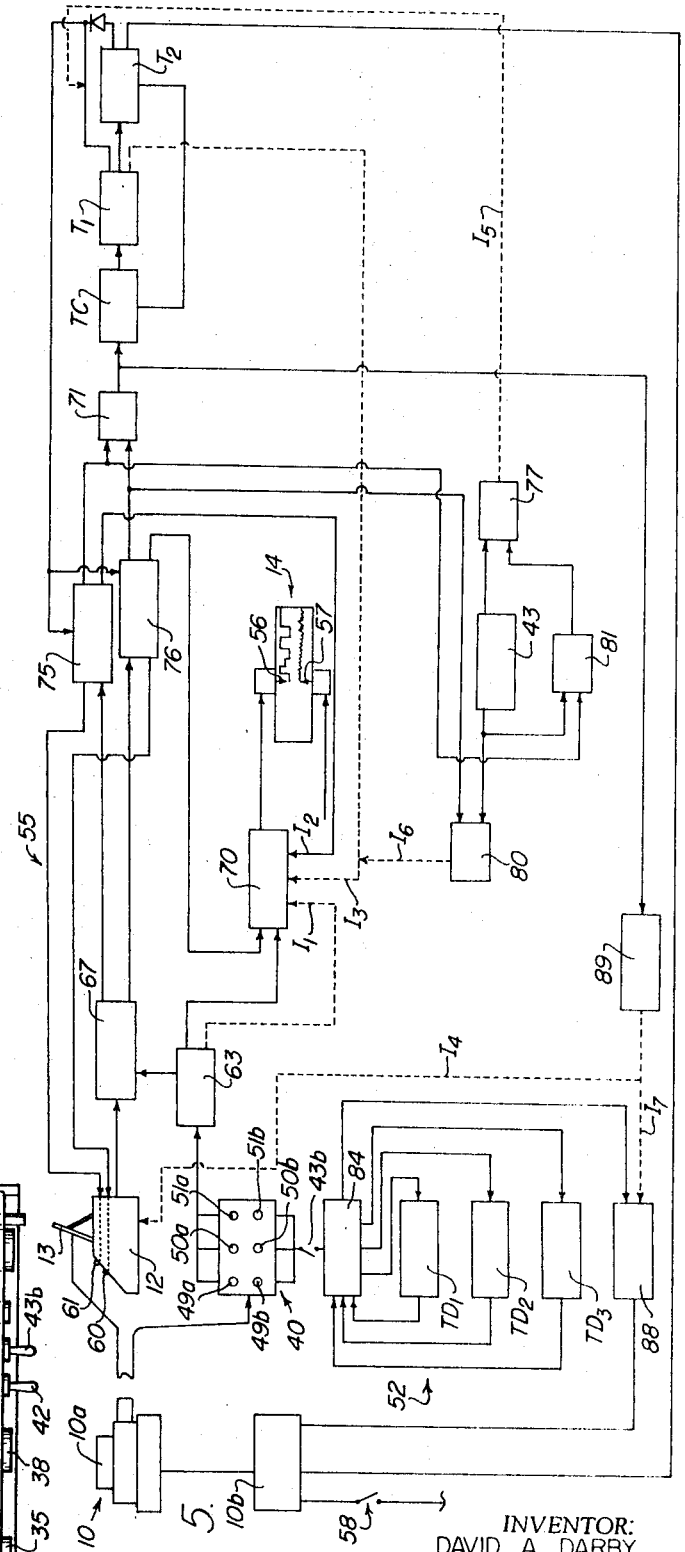

INVENTOR:
DAVID A. DARBY.
ATTORNEY.

INVENTOR:
DAVID A. DARBY.

BY:

ATTORNEY.

TEACHING AND EVALUATION MACHINE

BRIEF DESCRIPTION

In recent years there have been a large number of machines developed as teaching aids, and many of these have provided for the electronic selection of answers to prepared questions.

However, so far as I am aware, there has not heretofore been developed a machine that can be used for purposes other than teaching, merely by changing the mode of operation of the machine.

It is desirable to utilize a machine of this type in human research studies, programmed teaching and testing, crime detection, personnel selection and all business activities involving these factors. As a specific example, in the training of commercial pilots, it is important to know not only whether or not a student pilot can make a proper decision, but also the time required to make the selection and his emotional response during the time such selection is being made. With this information, it is possible to not only evaluate the answer given and the time taken in responding, but also the student's emotional response at the time the selection was made. It thus becomes possible to determine with reasonable accuracy whether or not the selection was based on a knowledge or belief of its correctness, or was merely a chance selection. Other occupations requiring proper split-second decision making likewise can be upgraded with a teaching and testing machine that will provide such results.

A principal object of the present invention is to provide a teaching and evaluation machine that can be used for multiple purposes, i.e. human research studies, programmed teaching and testing, crime detection, personnel selection and business activities involving these factors.

It is also an object to provide such a machine wherein the component parts thereof are compactly arranged, yet are made easily accessible for examination and repair purposes.

To accomplish these objects, I provide a machine incorporating a unique circuit compartment having a pivot suspension mounting for modules of the circuit so that they can be easily pivoted out of the compartment and that may, if desired, serve as a support while supplying accessible power for a slide projector. A sensing device is provided to program both a correct selection signal and a time limit signal into the circuit; a remote test panel, or selector, for subject use, that provides buttons for changing information presentations and also selection buttons corresponding to possible selections projected with questions and a viewing screen for displaying the information and/or questions projected; a continuous, time synchronized, strip chart recorder with a pair of marking pens; a body contact member adapted to be attached to the subject so that physiological response will be measured; and circuit means interconnecting the recorder and the pens thereof to the body contact member and the test panel, whereby one of the marking pens is operated in response to physiological changes of the subject and the other is operated concurrently to indicate selector operation by the subject.

Additional objects and features of the invention will become apparent from the following detailed description and drawings, disclosing what is presently contemplated as being the best form of the invention.

THE DRAWINGS

FIG. 1 is a perspective view of the machine of the invention, and showing the electrical lines connecting the individual components;

FIG. 2a, a vertical section taken on the line 2a—2a of FIG. 1;

FIG. 2b, a similar view, taken on the line 2b—2b of FIG. 1;

FIG. 3, a top plan view of the circuit compartment and circuit boards therein, but without showing the circuits in detail;

FIG. 4, a front elevation view of a typical coded slide holder for use with the projector component of the invention;

FIG. 5, a schematic block diagram showing the operation of the circuit of the invention;

FIG. 6, a circuit diagram, with circuit components blocked out to correspond with FIG. 5;

FIG. 7, a view of a typical chart showing the permanently recorded data obtained in its NORMAL mode of operation;

FIG. 8, a similar view of a chart obtained in the HOLD mode of operation of the invention; and FIG. 9, a view like FIGS. 7 and 8, but showing a chart record obtained when a time limit is set for answer selection.

DETAILED DESCRIPTION

Figure 6:
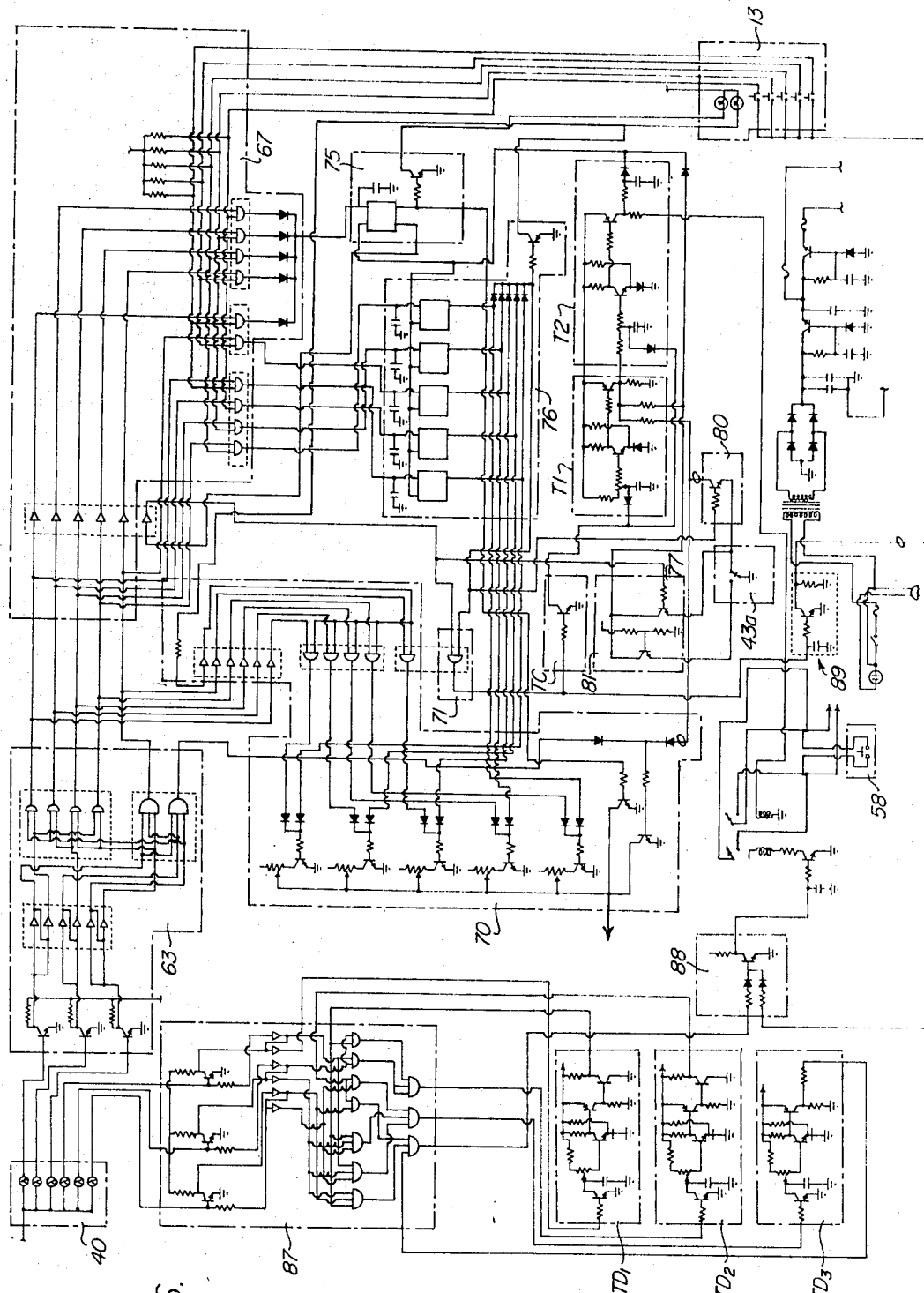

Referring now to the drawings:

In the illustrated preferred embodiment, the teaching and evaluation machine of the invention includes a slide projector 10, a circuit compartment 11, a remote test panel or selector 12, a viewing screen 13, a chart recorder 14 and a body contact member 15, all electrically interconnected, as will be described.

The projector 10 is shown as having a rotating slide drum 10a, but other slide projectors, constructed to provide for sequential feed and projection of slide photographs, could as well be used or a movie or film strip projector could be used with the movie film or film strip then providing data input in the same manner as the slide photographs hereinafter described. The projector may advantageously sit on the circuit compartment or it can be remotely positioned, and is operated in response to circuit changes also, as will be hereinafter described in detail. A line 16 and interconnected plugs 17 and 18 are used to connect the projector into the circuit.

The circuit compartment 11 is specially designed to allow for easy inspection, repair, or replacement of modular circuit components. While shown as being made of transparent plastic material, it should be obvious that other materials can be used and that the compartment does not have to be made transparent.

A base 19 has sidewalls 20 and 21 standing thereon. The sidewalls are provided with vertical grooves to slidably receive front and rear walls 22 and 23 which are held in place by screws 25, passed downwardly through the top cover and tapped into the sidewalls 20 and 21.

A pivot rod 26, has ends of reduced size journaled through holes provided therefor in front wall 22 and rear wall 23. Three strap hangars 27, 28, and 29 are journaled on rod 26 and each adjacent pair of strap hangars has a plurality of elongate plug boards 30 extending thereacross. Each plug board is adapted to receive the plugs 31 of one end of a printed circuit board 32, the other end of which is tightly fitted in grooves 33 of a removably upstanding partition 34 that stands on the base 19. The sockets of the socket straps are connected by lead wires to a power supply connector 35 in the rear wall 23; a connector 36 in sidewall 21 that is adapted to be connected to the selector 12; connectors 37 and 38 in rear wall 23, leading to the recorder 14 and the projector slide change unit 10b, respectively; a sensor 40 mounted to receive light from projector 10; and the on-off switch 42 and mode selector switches 43a and 43b, both mounted on the rear wall 23.

Merely by removing screws 25 and cover 24 access can be had to the interior of the circuit compartment. Thereafter, partition 34 and the sets of printed circuit boards connected through socket straps to the adjacent pairs of strap hangars can be pivoted about the rod 26, to raise the circuit boards out of the circuit compartment for still easier examination. Partition 34 can be removed, if desired, and by pulling their plugs free of the sockets in the socket straps the circuit boards can be entirely removed from the circuit compartment for repair or replacement. Although, not shown, additional pivot rods and support partitions can be fitted within the circuit compartment to support as many circuit boards as necessary to complete the circuitry. The number required, will of course, depend on such factors as the overall size of the circuit compartment, the size of circuit boards used, and the design of the circuits.

The connectors 35, 36, 37 and 38 all extend through their respective walls to be connected to the circuitry in the circuit compartment and to provide means for electrically connecting extension cords of required length. Such connectors are well-known and it is not believed necessary to describe them in detail in this application.

Screened air vents 45 are provided in cover 24 and front wall 22 to provide air circulation for cooling of the circuit components, and a fuse housing 46 is mounted to extend through the rear wall 23 so that the breaker fuse for the circuit is readily accessible without disassembly of the circuit compartment.

Sensor 40 is mounted to be in line with the lens of the projector and the light beam emitted therefrom. As shown, the sensor includes a cylindrical housing 40a, FIG. 2b, adapted to telescope over or otherwise fit on the lens housing of the projector. A ring 40b fits tightly, but slidably, within housing 40a and the ring has a number of photoelectric cells 49a, 50a and 50a extending forwardly at one side thereof and other photoelectric cells 49b, 50b, and 51b at the other side. A cord 40c extends through a flange in the housing 40a to connect the photoelectric cells into the circuit and the ring and cells can be slidably moved within a housing 40a, toward and away from the projector lens. The photoelectric cells are thus readily adjustably positioned to receive light from the projector 10, through the margins of programmed slides put through the projector. Obviously other means of mounting the cells could be used, but it should provide for proper positioning so that they will detect light signals, as will be further explained.

As shown in FIG. 4, the slide holders 53 for the slide photographs projected by projector 10 may have one or more holes 53a therethrough arranged such that the projecting light will pass through to activate one of the cells 49a, 50a or 51a or combinations thereof. Activation of one or more of these cells will then provide a signal into the control circuit, shown generally at 55, that will automatically move the selection responsive marker pen 56 of the recorder 14 to a position indicative of a correct selection. The operation of the selection response marker and the recorder will be further explained. If a film strip or movie film is used to supply data input, similar holes could be provided at the margins of appropriate film frames. Alternatively, a time program could be exposed on the film or could be supplied by magnetic or other optic or electrically sensed means similar to a standard sound track. Input control data could also be supplied by a direct electrical connection between the slide and a sensor or by magnetic interaction between the slide and a sensor.

The slide holders may also have one or more holes 53b arranged such that light passed therethrough will hit one or more of the photoelectric cells 49b, 50b or 51b. The combination of cells contacted will then determine the length of time that slide will be shown before it is automatically changed. Obviously, as with the marker circuit above described, other control systems can be used to regulate the time control circuit for regulating the length of each bit of information or question presented.

Each time a selection is to be made at the test panel of multiple choices projected onto the viewing screen 13, the control circuit is programmed by the simultaneous actuation of one or more of the photoelectric cells 49a—51a. At the same time, if the timing control circuit, shown generally at 52 (FIG. 5), is switched on, it will be programmed by actuation of one or more of the photocells 49b, 50b and 51b.

Simultaneously with the operation of selection marker pen 56 a continuous signal is transmitted from a body contact member 15, which may be of any reliable, conventional type used for detecting physiological response of a subject and which is physically connected to a subject (not shown) being tested, to continuously operate a second pen 57, i.e. a condition response marker pen.

In general, the invention operates as follows: Conventional slide photographs containing bits of information to be imparted are programmed in a desired sequence to be fed into the projector such that information on the slides is projected onto the viewing screen 13, where it can be readily seen by a subject viewer. Alternatively, instead of merely programming photographs containing information bits, or photographs containing questions and answers, both information bits and questions and answer containing photographs may be programmed. In any event, the subject viewer will absorb whatever information is projected and will change information slides or make answer selections as required, by operating the selector buttons on panel 12 or the changes will be made at a programmed rate if the automatic time control circuit is switched on. Panel 12 includes a slide change button 58, a focus switch 59, red and green indicator lights 60 and 61 for respectively indicating wrong and right selections and five selector buttons 62a, 62b, 62c, 62d and 62e to be used in indicating answer selections.

The overall operation of the machine is best shown in reference to FIGS. 5—9. As illustrated best in FIG. 5, information, which may be in the form of questions, is projected from the projector 10 onto the viewing screen 13, where it can be easily observed. If the information is in question form, light projected through the coded hole, or holes, in the frame of the slide photograph contacts one or more of the light sensitive cells 49a—51a in housing 48 of the sensor 40. This sends a correct information signal from the sensor through the decoder 63 to the comparator 67 and this signal is compared with one received at the comparator from the selector 12, in response to actuation of one of the test buttons 62a—62e.

The correct information signal is also transmitted from the decoder 63 to an output wave control unit 70, which regulates the continuous graph recorder 14, to move the selection marker pen 56 from its base line 0 on the graph sheet of the recorder to a location indicative of the correct answer. It should be noted, however, that the pen 56 will not be moved to its correct answer location unless all of the inhibits that will ground the output wave control unit have been removed. Pen 56 will normally be held at its baseline 0, FIGS. 7—9 so long as there is no signal being provided to the sensor 50 from a slide and so long as an inhibit signal $I_1$ from the decoder 63 acts on the output wave control unit, or whenever a correct answer selection of the pushbuttons 62a—62e has been made and an inhibit signal $I_2$ acts on the output wave control unit, or whenever the mode selector switch 43a has been operated to put the circuit in what shall hereafter be known as the NORMAL mode of operation and time $T_1$ has completed a cycle of operation so that an inhibit signal $I_3$ acts on the output wave unit, or whenever the automatic time control circuit 52 comprising a decoder logic 64 and multiple time delay combinations $TD_1$, $TD_2$ and $TD_3$ triggered by light sensitive detectors 49b, 50b and 51b, respectively of the sensor 40, has been switched into circuit 55 by actuation of switch 43b on the rear wall 23 of compartment 11, and the period of time provided by the coded light signal has been completed such that inhibit signal $I_1$ is again acting on the output wave unit.

Once it has been moved in response to a correct information signal through the output wave control unit 70, the pen 56 will maintain its correct answer location until either a right answer or a wrong answer has been selected or, if the circuit is in its AUTOMATIC mode until circuit 52 has operated. If a wrong answer selection is timely made, the output wave control will be modified and the pen will be moved to its modified location indicative of the wrong answer selection.

In the NORMAL mode of operation, (FIG. 6) but without the automatic time control circuit 52 switched on through switch 43b, a correct answer selection at selector 12 will cause the inhibit signal $I_2$ to ground the output from the output wave control unit and the pen 56 will move back to its baseline O. After a wrong answer selection the pen 56 will be moved to a position indicative of the selection made and the timer $T_1$ will start. When the time $T_1$ has timed out, the inhibit $I_3$ will be applied to ground the output signal of the output wave control unit and the pen will again be moved back to the baseline.

The selector buttons 62a—62e of panel 12 are arranged such that when one has been actuated an inhibit $I_4$ from an answer lock unit 89, triggered by a signal from OR gate 71 will prevent signals from other selections being transmitted to the comparator, whether or not either the initial or any of the subsequent selections is correct or incorrect.

The comparator 67 compares the correct information provided from the sensor 40 with the single selection transmitted from the selector 12 and then sends a signal to actuate either storage unit 75 or storage unit 76, respectively, in accordance with whether a correct or a wrong answer selection has been made.

Whenever either a correct or a wrong answer selection has been made, timer $T_1$ immediately starts its timing cycle.

Figure 7:
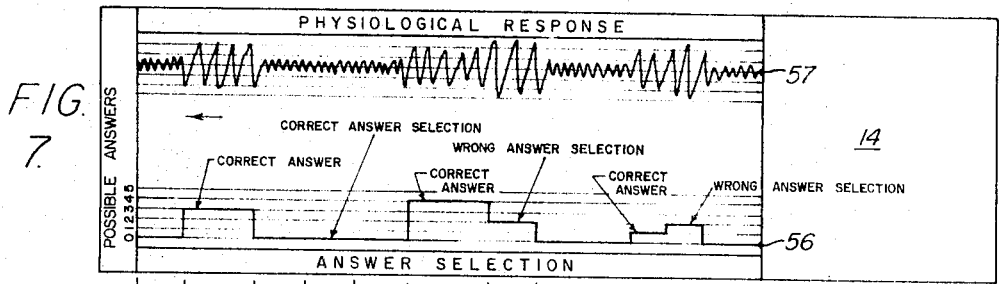

Assuming still that mode selector switch 43a has been operated to place the circuit in its NORMAL mode of operation, the mode selector will operate to supply a constant voltage to an OR gate 77 and through that and inhibit signal $I_5$, to inhibit resetting of the storage units 75 and 76. Thus, one time $T_1$ has timed out, timer $T_2$ is started and the inhibit signal $I_3$ is applied to the output wave control unit 70 to thereby move pen 56 back to its baseline O. As has been heretofore noted, when the correct information is sent from the decoder, through the output wave control and output inhibit to the graph recorder, the pen 56 is moved to a location on the graph indicative of the correct answer. As is best seen in FIG. 7, the pen remains at that location until an answer selection is made. If a correct answer selection is made the storage unit 75 is actuated and the inhibit signal $I_2$ is applied to the output wave control unit 70 to immediately change its output signal to move the pen 56 back to its baseline "O" where it will remain during operation of timers $T_1$ and $T_2$ and until such time as another correct information signal resulting from another slide has been put through the sensor 40. Thus, if a correct answer selection has been made, the pen 56 will have already moved to its baseline position and the inhibit signal $I_3$, later applied from timer $T_1$, will have no effect on the pen.

If, however, a wrong answer selection is made and storage unit 76 is actuated, a signal will be sent from storage unit 76 to the output wave control unit 70 to modify the output signal form the output wave control unit so that pen 56 is moved from its correct answer location to a new location representative of the answer selection made. The pen will then stay in that new location during operation of timer $T_1$ and until the inhibit signal $I_3$ from the timer $T_1$ is applied, to cause the pen to move back to its baseline "O." Regardless of the answer selection made, when the circuit is in its NORMAL mode, the inhibit signal $I_5$ is supplied from gate 77 to prevent reset signals from timer $T_1$ being applied to the storage units 75 and 76.

Timer $T_2$ will continue until it is timed out, at which time a slide change signal will be sent to the projector slide change unit 10b to change to a new slide and a reset signal is sent to the storage units 75 and 76 to place them in their starting state.

As the slides change, there is no information supplied to the sensor 40 and the inhibit signal $I_1$ is applied through the sensor to the output wave control unit 70 to further insure movement of pen 56 back to the baseline "O."

With the circuit in the NORMAL mode, the chart obtained is like that shown in FIG. 7 and an observer can easily determine the correct answer to a question presented by a slide, the decision time required to make an answer selection, which answer was selected, and whether or not the selected answer was correct.

Figure 8:
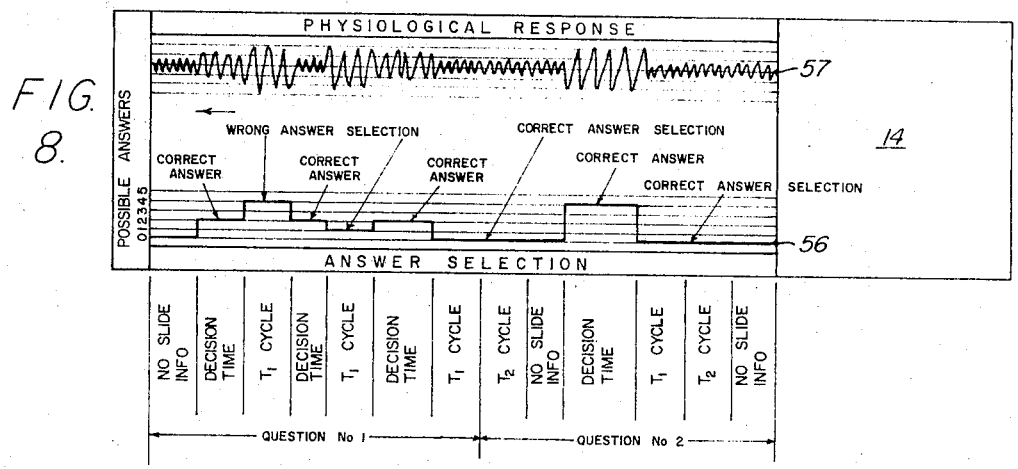

If it is assumed that the mode selector switch 43a has been operated to place the circuit in its HOLD mode of operation a chart pattern such as is shown in FIG. 8 will be obtained. In this case the mode selector will operate to supply a constant voltage to AND gates 80 and 81. Thus, if after pen 56 has been moved to a location representative of the correct answer, in response to information supplied through sensor 40, a correct answer selection is made, the storage unit 75 will be actuated. This starts the timer $T_1$ in the same manner previously described, and at the same time sends a signal to the AND gate 81, which cooperated with the signal already supplied through the mode selector switch to turn the gate on. A signal is then supplied through the gate 81 to OR gate 77 and from there, as an inhibit $I_5$ to the reset output signal from timer $T_1$. This prevents the signal generated after timer $T_1$ has timed out from immediately resetting the storage units 75 and 76 to their initial state. However, the inhibit signal $I_3$ is still applied to the output wave control unit to insure movement of the pen 56 to its baseline "O," as soon as timer $T_1$ has timed out.

The inhibit signal $I_2$ is also provided to the output wave control unit immediately after storage unit 75 is actuated by a correct answer selection, thereby moving pen 56 to its baseline "O."

If, while the circuit is in the HOLD mode a wrong answer selection is made, the timer $T_1$ will start as before and a signal will be sent from storage unit 76 to the output wave control unit to thereby reposition pen 56 to a location indicative of the answer selected, while still another signal will be supplied to the AND gate 80 such that its output will provide an inhibit signal $I_6$ to inhibit the inhibit signal $I_3$. This restrains inhibit signal $I_3$ from the timer $T_1$ from acting on the output wave control unit 70.

After timer $T_1$ has timed out, a reset signal is sent from the timer to the storage unit 76. This returns the unit to its original state such that OR gate 71 and timer control TC are turned off. At this time all of the inhibits $I_1$, $I_2$ and $I_3$ to the output wave control unit 70 are removed and no signal from the storage unit 76 is affecting the output wave control unit. The correct information from sensor 40 is controlling and pen 56 is again moved to its location indicative of the correct information. The circuit is then ready for another selection to be made.

Once a correct answer selection is made pen 56 will again move to its baseline "0" position and timer $T_2$ will be operated to change the slide as previously described.

Using the chart reproduced when the circuit is in the HOLD mode, FIG. 8, an observer can easily determine the correct answer to the question asked, the answer or answers selected by the individual being tested in response to the question, the sequence of answers selected and the time required to make each selection.

In either the NORMAL or the HOLD mode of operation, switch 43b can be operated to connect the automatic time control circuit 52 into the circuit 55. The light detected by the photoelectric cells 49b—51b will then trigger one or more of the time delay gates $TD_1$, $TD_2$ or $TD_3$ such that after the time allotted for answering the question presented by each slide, a signal is sent through the decoder logic unit 84 and a time limit inhibit gate 88 to the slide change unit 10b of projector 10 to change the slides. However, if an answer selection is made within the time allotted, and whether a correct or a wrong answer, a signal will be sent to the answer lock unit 89, an inhibit signal $I_7$ is then sent from unit 89 to time limit inhibit gate 88 to thereby inhibit the slide change signal to the projector slide change unit 10b, until the storage unit 75 or 76 operated by the answer selection has been reset. As noted previously, when the slides are changed the signal to the sensor 40 is cut off, the inhibit signal $I_1$ acts on the output wave control unit 70, and the entire circuit is reset.

Figure 9:
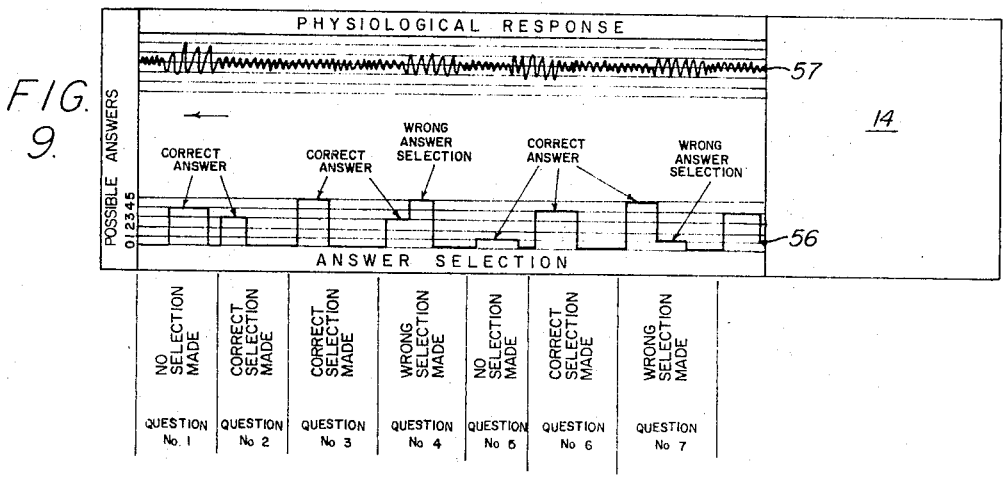

As is shown in FIG. 9, the changing of slides in response to a light signal detected by cells 49b—51b will cause the pen 56 to move to its baseline O during the changing of the slides, whereupon it will move initially to a position indicative of the correct answer, as coded onto the slide and detected by photoelectric cells 49l—51a. The time during which the pen 56 will be at the baseline between slide changes will be known and is regular, so that it can easily be determined from the chart whether or not an answer selection was timely made, in which case the pen will move to indicate an incorrect answer or to the baseline to indicate a correct answer. In the latter instance, the pen will then be at the baseline and will make a mark having a length longer than the regular one between automatic slide changes and will, therefore, be easily distinguishable therefrom.

In all operating modes, the red light 60 on panel 12 is energized whenever an incorrect selection is made to actuate storage unit 76 and the green light 61 is energized if a correct selection is made and storage unit 75 is actuated. In the HOLD modes the red light that is energized when the storage unit 76 is actuated will be deenergized when the storage unit is reset, thereby indicating that the circuit is ready for another selection.

Also, in all operating modes, the physiological response of the person being tested is applied to the chart that is made in timed relationship to the answers that are given. Thus, a comparison of the line formed by moving chart paper and the pen 57, which is moved transversely across the moving chart paper in accordance with the physiological response, to the line formed by the moving chart paper and pen 56 will allow a fairly reliable determination to be made as to whether or not the individual tested honestly knew the selected answers to be correct, or was merely guessing.

While the invention has been here described with a single chart and a single test panel or selector 12, it should be apparent that several could be used with a single projector and screen. In this arrangement, however, the automatic slide change circuit must be used to insure that each selector is readied for answer selection in unison, or the circuit must be modified somewhat to provide for slide changes only after all selectors have been operated to made an answer selection when in the NORMAL mode or to change only after a correct answer selection has been made at each selector, when the circuit is in the HOLD mode.

Although a preferred form of my invention has been herein disclosed, it is to be understood that the present disclosure is by way of example and that variations are possible. For example, the continuous recorder of the invention could take the form of data processing tape, readable by suitable means to provide almost instantaneous data readout and analysis.

I claim:

1. A teaching and evaluation machine comprising
   a continuous recorder;
   means for sensing physiological response of a subject person and for providing a record of the said response on the recorder;
   means for presenting a sequence of questions and multiple possible answers to each question for viewing by the subject person;
   means for marking the correct answer to each question on the recorder as the question and its multiple possible answers are presented to the subject person;
   means for use by the subject person in selecting one of the possible answers;
   means for marking the selected answer on the recorder, said correct answer and said selected answer being marked in time synchronization with the record of physiological response.

2. A teaching and evaluation machine according to claim 1, wherein
   the recorder is of continuous chart-type.

3. A teaching and evaluation machine according to claim 1, wherein
   the means for presenting a sequence of questions includes a projector, film means containing the questions, and a screen upon which the questions are adapted to be sequentially projected.

4. A teaching and evaluation machine according to claim 2, wherein
   the means for marking the correct answer to each question presented includes signal generating means presented with the question, sensor means to receive the signal generated thereby, and a marker pen operated in response to a signal at the sensor to move from a baseline position to a position representative of the correct answer.

5. A teaching and evaluation machine according to claim 1, wherein
   the means for use by the subject person in selecting one of the possible answers includes a selector having selection buttons corresponding to the possible answers and further including indicator means to indicate whether or not a selection button actuated by the subject person corresponds to the correct answer to the question being viewed.

6. A teaching and evaluation machine according to claim 5, wherein
   the means for marking the selected answer on the chart of the recorder includes means for positioning the marker pen at a location indicative of the answer selection when the answer selection is incorrect and for thereafter moving it back to the baseline and for moving it directly to the baseline when the answer selection is correct.

7. A teaching and evaluation machine according to claim 6, wherein
   the means for marking the selected answer on the chart of the recorder further includes selector means and alternate circuits provided thereby, whereby when incorrect answer selections are sequentially made the marker pen is moved to a location representative of each answer selected and is moved to the baseline after a correct answer selection is made.

8. A teaching and evaluation machine according to claim 1, further including
   means for automatically changing the question and multiple answers presented after a predetermined time period.

9. A teaching and evaluation machine according to claim 8, wherein
   the means for automatically changing the question and multiple answers presented includes
   signal generating means presented with the question and multiple answers, sensor means for receiving the signal generated thereby, and means responsive to the signal for operating an information change mechanism, of the means for presenting a sequence of questions and multiple possible answers, after a period of time dependent upon the signal generated.

10. A teaching and evaluation machine comprising a continuous recorder;
    means for presenting a sequence of questions and multiple possible answers to each question for viewing by a subject person;
    a marker means;
    means for operating the marker means to indicate the correct answer to each question on the recorder as soon as the question is presented;
    means for use by the subject person in selecting one of the possible answers; and
    means for operating the marker means to indicate the selected answer on the recorder.

11. A teaching and evaluation machine as in claim 10, wherein
    the recorder includes a chart; and
    the means for operating the marker means to indicate the correct answer includes signal generating means presented with the question, sensor means to receive the signal generated thereby, and a marker pen operated in response to the signal at the sensor to move from a baseline position on the chart to a position representative of the correct answer.

12. A teaching and evaluation machine according to claim 11, further including
    means for automatically changing the question and multiple answers presented after a predetermined time period.

13. A teaching and evaluation machine according to claim 12, wherein
    the means for automatically changing the question and multiple answers presented includes signal generating means presented with the question and multiple answers, sensor means for receiving a signal generated thereby, and means responsive to the signal for operating an information change mechanism of the means for presenting a sequence of questions and multiple possible answers after a period of time dependent upon the signal generated.

14. A teaching and evaluation machine according to claim 13, wherein
the means for presenting a sequence of questions and multiple possible answers includes a slide projector.

15. A teaching and evaluation machine according to claim 14, wherein
the signal generating means for moving the marker to the correct answer position and for automatically changing the question and multiple answers presented includes means for passing light in coded array through slide photographs, and wherein
the sensor means includes photoelectric cells responsive to the light passed through the slide photographs in a coded array.